US012791875B2

(12) United States Patent
Mukaiyama

(10) Patent No.: US 12,791,875 B2
(45) Date of Patent: Nov. 10, 2026

(54) SPECTACLE LENS AND SPECTACLES

(71) Applicant: HOYA LENS THAILAND LTD., Pathumthani (TH)

(72) Inventor: Hiroyuki Mukaiyama, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 311 days.

(21) Appl. No.: 18/683,165

(22) PCT Filed: Aug. 3, 2023

(86) PCT No.: PCT/JP2023/028357
§ 371 (c)(1),
(2) Date: Feb. 12, 2024

(87) PCT Pub. No.: WO2024/057759
PCT Pub. Date: Mar. 21, 2024

(65) Prior Publication Data
US 2025/0130437 A1 Apr. 24, 2025

(30) Foreign Application Priority Data
Sep. 15, 2022 (JP) ................................ 2022-146906

(51) Int. Cl.
*G02C 7/02* (2006.01)
*G02C 7/06* (2006.01)

(52) U.S. Cl.
CPC ............ *G02C 7/068* (2013.01); *G02C 7/022* (2013.01); *G02C 7/027* (2013.01); *G02C 2200/08* (2013.01)

(58) Field of Classification Search
USPC .... 351/158, 159.01, 159.41, 159.42, 159.43, 351/159.48, 159.7
See application file for complete search history.

(56) References Cited

U.S. PATENT DOCUMENTS 10,466,483 B2 11/2019 Quere et al.
10,606,078 B2 * 3/2020 Schuster ........... G02B 27/0172
(Continued)

FOREIGN PATENT DOCUMENTS

DE 102020214478 A1 5/2022
JP 2006-003872 A 1/2006
(Continued)

OTHER PUBLICATIONS

Mar. 1, 2025 International Preliminary Report on Patentability issued in International Patent Application No. PCT/JP2023/028357.
(Continued)

*Primary Examiner* — Darryl J Collins
(74) *Attorney, Agent, or Firm* — Oliff PLC

(57) ABSTRACT

A spectacle lens and related techniques, the spectacle lens having an object-side surface and an eyeball-side surface and including a light guide member, a first lens element that is adjacent to the light guide member on an object side, and a second lens element that is adjacent to the light guide member on an eyeball side, in which, when a light beam that passes through the first lens element and the second lens element forms an image to obtain an image of reality, a wearer's prescription values are realized with the first lens element and the second lens element, a virtual image that is obtained by formation of an image with a light beam that travels in the light guide member and passes through the second lens element is displayed by the second lens element away from the wearer by a predetermined one distance.

10 Claims, 1 Drawing Sheet

(56) References Cited

U.S. PATENT DOCUMENTS

| | | | | |
|---|---|---|---|---|
| 11,630,325 | B1 * | 4/2023 | Almanza-Workman | G02B 1/11 351/158 |
| 2007/0070859 | A1 * | 3/2007 | Hirayama | G02B 27/0172 369/112.04 |
| 2016/0085300 | A1 * | 3/2016 | Robbins | H04N 23/673 345/633 |
| 2017/0010465 | A1 | 1/2017 | Martinez et al. | |
| 2017/0192250 | A1 | 7/2017 | Rousseau et al. | |
| 2017/0343808 | A1 | 11/2017 | Asayama et al. | |
| 2019/0293938 | A1 * | 9/2019 | Le Saux | G02C 7/02 |
| 2019/0377122 | A1 | 12/2019 | Danziger | |
| 2020/0096772 | A1 * | 3/2020 | Adema | G02B 6/0016 |
| 2020/0271935 | A1 * | 8/2020 | Weber | G02B 27/0955 |
| 2021/0141225 | A1 * | 5/2021 | Meynen | G02B 27/0172 |
| 2021/0333552 | A1 * | 10/2021 | Chiu | G02B 27/4205 |
| 2023/0273457 | A1 * | 8/2023 | Graf | G02C 7/022 351/159.01 |

FOREIGN PATENT DOCUMENTS

| | | | |
|---|---|---|---|
| JP | 2015-179200 | A | 10/2015 |
| JP | 2018-528446 | A | 9/2018 |
| JP | 2021-131574 | A | 9/2021 |
| JP | 2022-069469 | A | 5/2022 |
| WO | 2015/081313 | A2 | 6/2015 |
| WO | 2016/103877 | A1 | 6/2016 |

OTHER PUBLICATIONS

Aug. 12, 2026 Extended European Search Report issued in European Application No. 23865119.4.

* cited by examiner

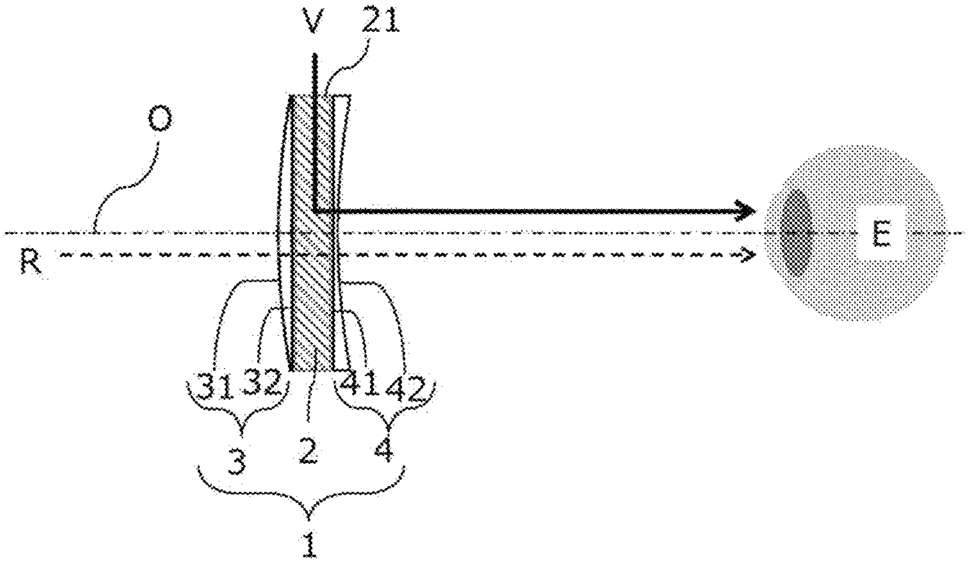
V
21
O
R
E
31
32
41
42
3
2
4
1

SPECTACLE LENS AND SPECTACLES

TECHNICAL FIELD

The present invention relates to a spectacle lens and spectacles. The present invention relates particularly to a spectacle lens and spectacles pertaining to systems that enable wearers to experience virtual reality and/or augmented reality and can be worn on users' heads. The present invention is also applicable to a lens element that configures spectacle lenses and, furthermore, a spectacle frame.

BACKGROUND ART

PTL 1 is known regarding virtual reality and augmented reality images and visualization systems. PTL 1 describes that a variable focus optical element capability may be used to provide a perception of light that is generated from a waveguide coming from a specific focal distance to eyes by changing the focus of the wavefront of the light that appears from the waveguide (reference sign 166 in FIG. 7A).

CITATION LIST

Patent Literature

[PTL 1] WO 2015-081313

SUMMARY OF INVENTION

Technical Problem

In the technique described in PTL 1, a varifocal lens is employed. Incidentally, in the case of using a varifocal lens, a special lens such as a liquid crystal lens or an electro-active lens becomes necessary.

If it is possible to allow wearers to appropriately experience virtual reality and/or augment reality while using a non-varifocal lens, which is a material of normal spectacle lenses, the hurdle of experiencing virtual reality and/or augment reality can be further lowered.

An objective of one example of the present invention is to provide a technique enabling wearers to appropriately experience virtual reality and/or augment reality using a material of normal spectacle lenses.

Solution to Problem

In order to appropriately provide the above-described experience to wearers with presbyopia, a progressive power lens becomes necessary. There is another option of wearing spectacle lenses that provide the above-described experience and, furthermore, spectacles into which the spectacle lenses are fitted into the spectacle frame over the top of spectacle lenses that are progressive power lenses already owned by wearers. Hereinafter, these spectacles will also be referred to as experience spectacles. Hereinafter, this spectacle lens will also be referred to as an experience lens.

Incidentally, virtual images that are obtained by the formation of images with light beams that have traveled in a light guide member are distorted due to the progressive action of the progressive power lenses already owned by the wearers.

The present inventors intensively studied this point and conceived of the following aspects to enable wearers to appropriately experience virtual reality and/or augment reality using a material of normal spectacle lenses. An aspect according to the present knowledge is referred to as an aspect group 1.

A first aspect of the present invention is a spectacle lens having an object-side surface and an eyeball-side surface and including a light guide member, a first lens element that is adjacent to the light guide member on an object side, and a second lens element that is adjacent to the light guide member on an eyeball side, in which, when a light beam that passes through the first lens element and the second lens element forms an image to obtain an image of reality, a wearer's prescription values are realized with the first lens element and the second lens element, a virtual image that is obtained by formation of an image with a light beam that travels in the light guide member and passes through the second lens element is displayed by the second lens element away from a wearer by a predetermined one distance, and the first lens element includes a progressive power lens that realizes an addition power that is one of the wearer's prescription values.

A second aspect of the present invention is the spectacle lens according to the first aspect, in which the first lens element is a progressive power lens that realizes the addition power among the prescription values, and the second lens element realizes values other than the addition power among the prescription values.

A third aspect of the present invention is the spectacle lens according to the first aspect, in which the light guide member has a flat plate shape having two flat surfaces, the first lens element includes one progressive power lens and plus lens, a surface on which the plus lens is adjacent to the flat surface of the light guide member is flat, and the second lens element includes one minus lens, and a surface on which the minus lens is adjacent to the flat surface of the light guide member is flat.

In the case of appropriately providing the above-described experience to eyes with a refractive error, there is still another option of wearing the above-described experience spectacles from above spectacle lenses (for example, monofocal lenses) already owned by a wearer. Incidentally, a gap may be formed between the spectacle lens already owned by the wearer and the experience lens. When a gap is formed between both lenses, the angle of view at which the wearer can view decreases.

The present inventors intensively studied this point and conceived of the following aspects to enable wearers to appropriately experience virtual reality and/or augment reality images using a material of normal spectacle lenses. An aspect according to the present knowledge is referred to as an aspect group 2.

A fourth aspect of the present invention is a spectacle lens having:

an object-side surface and an eyeball-side surface and including a light guide member, a first lens element that is adjacent to the light guide member on an object side, and a second lens element that is adjacent to the light guide member on an eyeball side, in which, when a light beam that passes through the first lens element and the second lens element forms an image to obtain an image of reality, a wearer's prescription values are realized with the first lens element and the second lens element, a virtual image that is obtained by formation of an image with a light beam that travels in the light guide member and passes through the second lens element is displayed by the second lens element away from the wearer by a predetermined one distance, the first lens element includes a plus lens having a positive lens prescription of a reciprocal of the predetermined one distance, the second lens element includes one functional complex lens, and a spherical equivalent of the functional complex lens is a value obtained by combining a negative lens prescription of the reciprocal of the predetermined one distance and a spherical equivalent of the prescription values.

A fifth aspect of the present invention is the spectacle lens according to the fourth aspect, in which the light guide member has a flat plate shape having two flat surfaces, a surface on which the plus lens is adjacent to the flat surface of the light guide member is flat, and a surface on which the functional complex lens is adjacent to the flat surface of the light guide member is flat.

The use of a non-varifocal lens, which is a material of normal spectacle lenses, means the use of a material of normal spectacle lenses (for example, a material made of plastic or glass). The presence or absence of a refractive error and the degree thereof vary with each wearer. In addition, the distance of displaying a virtual image (which refers to a distance from a wearer, which will be applied below) also varies with the kind of a virtual image to be displayed and the display status. The fact that one non-varifocal lens is used means that it is not possible to cope with each wearer and a variety of statuses in a virtual image.

The present inventors intensively studied this point and conceived of the following aspects to enable wearers to appropriately experience virtual reality and/or augment reality images using a material of normal spectacle lenses. An aspect according to the present knowledge is referred to as an aspect group 3.

A sixth aspect of the present invention is spectacles including:

a spectacle lens having an object-side surface and an eyeball-side surface and including a light guide member, a first lens element that is adjacent to the light guide member on an object side, and a second lens element that is adjacent to the light guide member on an eyeball side, in which, when a light beam that passes through the first lens element and the second lens element forms an image to obtain an image of reality, a wearer's prescription values are realized with the first lens element and the second lens element, and a virtual image that is obtained by formation of an image with a light beam that travels in the light guide member and passes through the second lens element is displayed by the second lens element away from the wearer by a predetermined one distance, and a spectacle frame, in which at least any of the first lens element and the second lens element is detachable.

A seventh aspect of the present invention is the spectacles according to the sixth aspect, in which at least the second lens element is detachable.

An eighth aspect of the present invention is the spectacles according to the sixth or seventh aspect, in which the spectacle frame includes at least any of a first lens element holder having a mechanism of making the first lens element detachable and a second lens element holder having a mechanism of making the second lens element detachable.

Each of the above-described aspects may be combined as appropriate.

Hereinafter, additional aspects of the present invention in the case of paying attention to a lens element in each of the above-described aspect groups will be described. Each of the above-described aspects may be combined as appropriate with the following aspects.

An eighth aspect of the present invention is a lens element including:

a first lens element that is one progressive power lens that realizes an addition power among prescription values and a plus lens having a predetermined positive lens prescription at a progressive starting point, and a second lens element that is one minus lens that realizes values other than the addition power among the prescription values and has a negative lens prescription that is equivalent to the positive lens prescription in terms of an absolute value.

A ninth aspect of the present invention is a lens element including:

a first lens element that is a plus lens having a predetermined positive lens prescription and a second lens element that is one functional complex lens having a lens prescription obtained by combining a negative lens prescription that is equivalent to the positive lens prescription in terms of an absolute value and a spherical equivalent that is one of prescription values.

A tenth aspect of the present invention is the lens element according to the ninth aspect, in which the first lens element is one progressive power lens that realizes an addition power among prescription values and a plus lens having a predetermined positive lens prescription at a progressive starting point.

An eleventh aspect of the present invention is the lens element according to any one of the eighth to tenth aspects, in which the first lens element has two main surfaces, the second lens element has two main surfaces, and one main surface of the first lens element and one main surface of the second lens element are both flat.

A twelfth aspect of the present invention is a lens element that is one functional complex lens having a lens prescription obtained by combining a spherical equivalent that is one of prescription values and a negative lens prescription of −0.25 D or less.

A thirteenth aspect of the present invention is the lens element according to the twelfth aspect, in which the lens element has two main surfaces, and one main surface is flat.

Hereinafter, additional aspects will be described. Each of the above-described aspects may be combined as appropriate with the following aspects.

The second lens element may realize at least any of a cylinder of other than 0D and a prism diopter of other than 0Δ among the prescription values. At that time, the first lens element may have a positive lens prescription of the reciprocal of the predetermined one distance in at least a lens center. In the aspect group 1, a progressive surface that realizes the addition power while maintaining the positive lens prescription in the lens center may be provided.

In the aspect group 1, a case where the first lens element includes a progressive power lens has been described, but a different functional lens (for example, a photochromic lens) may be provided together with the progressive power lens or instead of the progressive power lens.

A spectacle frame into which a spectacle lens is fitted, the spectacle lens having an object-side surface and an eyeball-side surface and including a light guide member, a first lens element that is adjacent to the light guide member on an object side, and a second lens element that is adjacent to the light guide member on an eyeball side, in which, when a light beam that passes through the first lens element and the second lens element forms an image to obtain an image of reality, a wearer's prescription values are realized with the first lens element and the second lens element, and a virtual image that is obtained by formation of an image with a light beam that travels in the light guide member and passes through the second lens element is displayed by the second lens element away from the wearer by a predetermined one distance, the spectacle frame including at least any of a first lens element holder having a mechanism of making the first lens element detachable and a second lens element holder having a mechanism of making the second lens element detachable.

A virtual image display system including the spectacle lens and an image light emission part that emits image light and a program for making a function that is brought by the system exhibited in a computer.

Advantageous Effects of Invention

According to one example of the present invention, wearers are enabled to appropriately experience virtual reality and/or augment reality using a material of normal spectacle lenses.

BRIEF DESCRIPTION OF DRAWINGS

FIG. 1 is a schematic horizontal cross-sectional view showing a spectacle lens of one aspect of the present invention functioning as a part of a virtual image display system.

DESCRIPTION OF EMBODIMENTS

Hereinafter, one aspect of the present invention will be described. "To" indicates a predetermined numerical value or more and a predetermined numerical value or less.

Common Matters to Aspect Groups 1 to 3

One aspect of the present invention relates to a spectacle lens, spectacles and a lens element pertaining to systems that enable wearers to experience virtual reality and/or augment reality and can be worn on users' heads.

A system according to one aspect of the present invention has an image light emission part that emits image light and the following spectacle lens. The image light emission part refers to a part provided with a configuration necessary to emit image light such as a light source and a projection lens. Similar to an image of reality, a virtual image is recognized by a wearer after a light beam of image light passes through the pupils of the wearer and forms an image on the retinae. The virtual image is not limited and may be a video or a still image.

This system may be a head-mounted display or may be smart glasses. Hereinafter, a case where this system is smart glasses will be described. One aspect of the present invention is also a spectacle lens in these smart glasses.

The spectacle lens according to one aspect of the present invention will be described based on FIG. 1. FIG. 1 is a schematic horizontal cross-sectional view showing the spectacle lens of one aspect of the present invention functioning as a part of a virtual image display system. Each reference sign is as described in the description in the "reference sign list" section. In the present specification, reference signs will not be described.

The spectacle lens according to one aspect of the present invention has a see-through function and has an object-side surface and an eyeball-side surface. The object-side surface and the eyeball-side surface face each other, a surface part present opposite to the object-side surface in the optical-axis direction is the eyeball-side surface, and, conversely, a surface part present opposite to the eyeball-side surface in the optical-axis direction is the object-side surface.

A y direction mentioned in the present specification is a direction along the meridian and is the vertical direction. An upward direction from a lens in a worn state is defined as a +y direction, and a downward direction from the lens is defined as a −y direction. An x direction is a direction orthogonal to the meridian and is the horizontal direction. When a wearer views a lens, a direction toward the right of the lens is defined as a +x direction, and a direction toward the left of the lens is defined as a −x direction. A direction that is orthogonal to the x direction and the y direction and is a lens thickness direction (optical-axis direction) is defined as a z direction, a direction toward the object is defined as a +z direction, and a direction toward the eyeball is defined as a −z direction.

One characteristic of one aspect of the present invention is to replace the varifocal lens in PTL 1 with a non-varifocal lens. Regarding configurations other than the technique pertaining to, for example, the optical part in PTL 1 (the specific configurations of the light source, the projection lens and the light guide member (or a waveguide), a drive control part of the system and the like), the configurations will not be described in detail since well-known configurations may be employed.

The spectacle lens according to one aspect of the present invention includes a light guide member, a first lens element that is adjacent to the light guide member on the object side, and a second lens element that is adjacent to the light guide member on the eyeball side.

The light guide member according to one aspect of the present invention may include a part inside of which a light beam actually passes through (also referred to as the waveguide in the present specification) and a part that covers and protects the waveguide.

The first lens element is adjacent to the light guide member on the object side. The second lens element is adjacent to the light guide member on the eyeball side. "Being adjacent" mentioned in the present specification includes a state of being in physical contact with the light guide member and a state of being not in contact with but close to the light guide member (for example, the separation distance at the geometric center of the lens is a maximum of 8 mm, 5 mm or 3 mm).

Both the first lens element and the second lens element are plastic or glass non-varifocal lenses. The first lens element and the second lens element may include a hard coat layer, an antireflection layer, an anti-fouling layer or the like.

The spectacle lens according to one aspect of the present invention has a see-through function. Therefore, when a light beam that passes through the first lens element and the second lens element forms an image to obtain an image of reality, the prescription values of a wearer are realized with the first lens element and the second lens element. The prescription values of the wearer are realized using the refractive index and surface shape of the material of each of the first lens element and the second lens element.

In addition, a virtual image that is obtained by the formation of an image with a light beam that travels in the light guide member and passes through the second lens element is displayed with the second lens element away from the wearer by a predetermined one distance. This predetermined one distance is also referred to as "display distance".

As shown in FIG. 1, the light beam of the virtual image passes through the second lens element, not the first lens element. Therefore, for the second lens element, a curved surface shape that enables the virtual image to be displayed away from the wearer by the display distance (for example, two meters) needs to be set. As a specific example, a concave surface having a lens prescription of 0.50D (=1/(2 m)) (that is, −0.50D) may be set as the curved surface shape. Along with that, +0.50D needs to be set for the first lens element. This configuration makes it possible for a wearer to appropriately recognize the outside world and appropriately recognize the virtual image at a place away by the display distance as long as the wearer has no refractive errors.

Incidentally, the prescription values of the wearer are written on the lens bag of the spectacle lens. This is not an exception even in a case where a light guide member is provided as in the spectacle lens according to one aspect of the present invention. This is because, in the spectacle lens according to one aspect of the present invention, refractive errors are corrected in the recognition of the outside world and thus the description of the prescription values becomes necessary. As a result, even the spectacle lens according to one aspect of the present invention accompanies a lens bag.

If there is a lens bag, the lens bag can be specified as an item for a spectacle lens based on the prescription values of a wearer. In addition, it is normal for a spectacle lens to form a set with a lens bag. Therefore, the technical concept of the present invention is also reflected in spectacle lenses accompanying a lens bag, which is also true for the sets of a lens bag and a spectacle lens.

Examples of the prescription values of a wearer include the spherical equivalent (S lens prescription) at the time of a front view (at infinity), the cylinder (C lens prescription), the astigmatic axis (Ax) and the prism diopter (Δ). In the case of progressive power lenses, examples thereof also include the addition power (ADD) in addition to the above-listed values. "Addition power" in the present specification refers to a difference from the spherical equivalent at the time of a front view (at infinity) to a lens prescription necessary to correct the eyesight at the time of near vision (a positive value in the present specification).

The number of lenses configuring the first lens element is not limited. The number of lenses configuring the second lens element is not limited. Incidentally, since an increase in the number of the lenses leads to an increase in the thickness of the experience lens, it is preferable that the lens configuring the first lens element is one plus lens (having a convex surface as the object-side surface) and the lens configuring the second lens element is one minus lens (having a concave surface as the eyeball-side surface). These will be described in detail below.

In the case of the above-described example, the object-side surface is a convex surface and the eyeball-side surface is a concave surface in the spectacle lens. That is, in the case of the above-described example, the spectacle lens is a meniscus lens.

Aspect Group 1

One of the characteristics of the aspect group 1 is that the first lens element includes a progressive power lens that realizes the addition power, which is one of the prescription values of a wearer.

As described in the above-described "means" section, virtual images that are obtained by the formation of images with light beams that have traveled in a light guide member are distorted due to the progressive action of the progressive power lenses already owned by wearers. A countermeasure thereto is to include the above-described characteristic of the aspect group 1. The light beam pertaining the virtual image does not pass through the first lens element. With attention paid to this point, one of the characteristics of the aspect group 1 is to concentrate the progressive component of the progressive power lens in the first lens element through which the light beam pertaining to the virtual image does not pass. Due to this characteristic, the virtual image is not distorted due to the progressive action while the wearers' presbyopia can be corrected.

The addition power among the prescription values is preferably realized with the first lens element that is the progressive power lens. In one specific example of the aspect group 1, the object-side surface of the first lens element is a progressive surface, but the eyeball-side surface of the first lens element and both the object-side surface of the second lens element and the eyeball-side surface of the second lens element are not progressive surfaces. In such a case, the addition power can be said to be realized with the first lens element (moreover, the object-side surface of the first lens element) alone.

In addition, values other than the addition power among the prescription values are preferably realized with the second lens element. It is needless to say that the prescription values are realized by the combination of the object-side surface and the eyeball-side surface of the spectacle lens. Incidentally, in one specific example of the aspect group 1, it is preferable that, while a progressive surface is used as the object-side surface of the first lens element, simply, the lens prescription at the lens center (to be described below) of the first lens element is set to a lens prescription corresponding to the display distance of the virtual image.

In addition, the prescription values including the addition power are realized by processing the eyeball-side surface of the second lens element into a predetermined shape when a light beam, which is an outside world light that has passed through the first lens element and the second lens element, forms an image on a wearer's retinae and the wearer recognizes an image of reality. The prescription values other than the addition power being made to be satisfied using the shape of the second lens element (the eyeball-side surface in the case of one lens) as described above will be referred to as "the values other than the addition power among the prescription values are realized with the second lens element" in the present specification.

As described in the above paragraph, the first lens element is also indispensable in the realization of the prescription values to recognize images of reality. Incidentally, in the example described in the present paragraph, the first lens element mainly has a role of realizing the addition power and a role of having a positive lens prescription corresponding to the display distance at which the virtual image is disposed. Therefore, "the values other than the addition power among the prescription values are realized with the second lens element" may also be expressed as "the first lens element does not make any special contribution that affects the realization of the prescription values other than the addition power".

It is needless to say that the values other than the addition power can be realized with the first lens element; however, in such a case, the progressive power lens, which is the first lens element, has a complicated surface shape. If it is necessary to prepare such a first lens element as a non-varifocal lens, there might be cases where it is easier to prepare a varifocal lens.

Therefore, it is preferable to use a progressive power lens that realizes the addition power among the prescription values as the first lens element. A process of making the values other than the addition power among the prescription values reflected is easy compared with a process of making the progressive component reflected. Therefore, there is no problem in processing the second lens element by reflecting the values other than the addition power among the prescription values.

The light guide member preferably has a flat plate shape having two flat surfaces (main surfaces) that face each other in the lens thickness direction. The light guide member can also be curved. It is also possible to curve the light guide member to form a meniscus shape. However, when a waveguide is curved, control relating to the formation of a virtual image becomes extremely difficult. When the surface shape of a part that covers and protects the waveguide is curved, the light guide member becomes bulky. This leads to an increase in the edge thickness of the spectacle lens. In the case of employing an aspect of spectacles (smart glasses), an increase in the edge thickness is not preferable. Therefore, the light guide member is preferably provided with a flat plate shape.

"Flat plate shape" in the present specification includes a completely flat plate shape and also includes an incompletely flat plate shape. Regarding the incompletely flat plate shape, a shape having a dent provided in, for example, a part where the light guide member is linked to the image light emission part that emits image light on one surface of the flat surfaces, which are the two main surfaces, is also regarded as the flat plate shape. As an example, a case where 50 area % or more (preferably 80 area % or more) of each of the two main surfaces of the light guide member is present on the same flat surface is regarded as the flat plate shape.

Based on what has been described above, it is preferable that the first lens element includes one progressive power lens and plus lens and a surface on which the plus lens is adjacent to the flat surface of the light guide member is made to be flat. In addition, it is preferable that the second lens element includes one minus lens and a surface on which the minus lens is adjacent to the flat surface of the light guide member is made to be flat.

When the two main surfaces of the light guide member have a curved surface shape, the surface of the first lens element that is adjacent to the light guide member also needs to have a shape following the curved surface shape. This is because an unintended refractive power is generated even between the first lens element and the light guide member. In such a case, it is necessary to process one surface to reflect the progressive component in the first lens element, and time and effort is thus taken to process the surface into a curved surface shape following the light guide member. In such a case, if the light guide member would be provided with a flat plate shape from the beginning, there is no need to process the surface into a curved surface shape. The contents of the present paragraph also apply to the second lens element.

Hereinafter, a specific example assuming a case where a virtual image is displayed away by two meters while the light guide member is provided with the flat plate shape will be described.

On the object-side surface of the first lens element, which is the progressive power lens, the lens prescription is set to +5.00D at the measurement reference point F and the lens center (optical center, fitting point or eye point). The progressive starting point is disposed at the lens center or immediately below the lens center. In addition, in a case where the addition power among the prescription values of a wearer with presbyopia is 1.50D, the lens prescription is set to 2.00D at the near vision power measurement reference point. The eyeball-side surface of the first lens element is flat (plano). That is, the first lens element is a plus lens.

Meanwhile, the positions of the measurement reference point F, the fitting point or the eye point FP and the measurement reference point N can be specified by referring to a remark chart or a centration chart that is published by lens manufacturers.

The eyeball-side surface of the second lens element has a shape reflecting the values other than the addition power among the prescription values. For example, in a case where the S lens prescription of the prescription values is −3.00D and the C lens prescription is 0.00D, the eyeball-side surface is provided with a concave shape of −3.50D that is obtained by combining −0.50D and the S lens prescription of −3.00D to display the virtual image away by two meters. The object-side surface of the second lens element is flat (plano). That is, the second lens element in this example is a minus lens.

The contents described in the "aspect group 1" section can be combined as appropriate into other aspect groups or modification examples.

Aspect Group 2

One of the characteristics of the aspect group 2 is that the second lens element has a lens prescription that is obtained by combining a lens prescription corresponding to the display distance (−0.50D in the above-described example) and the spherical equivalent, which is one of the prescription values. That is, one of the characteristics of the aspect group 2 is the integration of a lens element that exhibits a function of displaying a virtual image at a predetermined distance and a lens element that exhibits a function of correcting a wearer's refractive error with the second lens element.

As described in the above-described "means" section, a gap is generated between a spectacle lens already owned by the wearer and the experience lens. When a gap is generated between both lenses, the angle of view at which the wearer can view decreases. A countermeasure thereto is to include the above-described characteristic of the aspect group 2. Due to this characteristic, no gaps are generated between both lenses, and the angle of view at which the wearer can view does not decrease.

A specific configuration of the aspect group 2 is as described below. The first lens element includes a plus lens having a positive lens prescription of the reciprocal of the predetermined one distance. In addition, the second lens element includes one functional complex lens having a lens prescription that is obtained by combining a negative lens prescription of the reciprocal of the predetermined one distance and the spherical equivalent, which is one of the prescription values. In detail, the spherical equivalent of the functional complex lens is a value that is obtained by combining a negative lens prescription of the reciprocal of the predetermined one distance and the spherical equivalent of the prescription values. In any cases, the functional complex lens includes a lens prescription corresponding to the predetermined one distance and the prescription values (the spherical equivalent, the cylinder, the astigmatic axis, the prism diopter and the like).

In the case of employing the specific example with numerical values and the example where the light guide member has the flat plate shape, which are used in the aspect group 1, in the aspect group 2, the first lens element includes a plus lens in which the object-side surface is +0.50D (a positive lens prescription that is the reciprocal of the display distance) and the surface that is the eyeball-side surface and adjacent to the light guide member is 0D (plano). The second lens element includes one minus lens in which the eyeball-side surface has a concave shape of −3.50 D (=−0.50D+(−3.00D)), which is a negative lens prescription, and the surface that is the object-side surface and adjacent to the light guide member is 0D (plano).

In the example of the above-described paragraph, one minus lens having a negative lens prescription that is obtained by combining a negative lens prescription of the reciprocal of the display distance and the spherical equivalent, which is one of the prescription values, has been exemplified, but the lens that is included in the second lens element is not limited thereto. For example, in a case where the S lens prescription of the prescription values is +3.00D, the eyeball-side surface has a convex shape (plus lens) of +2.50D (=−0.50D+3.00D), which is a positive lens prescription. In addition, in a case where the S lens prescription of the prescription values is +0.5.D, the eyeball-side surface becomes 0D (=−0.50D+0.50D). In a case where the light guide member has a flat plate shape, consequently, the second lens element includes one disc-like lens. The collective term of lenses that are provided in the second lens element in such a case is “functional complex lens”.

The contents described in the “aspect group 2” section can be combined as appropriate into other aspect groups or modification examples.

Aspect Group 3

The aspect group 3 is an aspect for which attention is paid to spectacles (smart glasses). One of the characteristics of the aspect group 3 is that at least any of the first lens element and the second lens element (at least the second lens element and both lens elements depending on the situation) is made to be detachable from the spectacles. Hereinafter, a case where both lens elements are detachable from the spectacles will be exemplified, but only one of both lens elements may be detachable and, in particular, only the second lens element may be detachable. Therefore, the present invention is not limited to this example.

As described in the above-described “means” section, the fact that one non-varifocal lens is used means that it is not possible to cope with each wearer and a variety of statuses in a virtual image. A countermeasure thereto is to prepare a variety of kinds of the first lens elements and the second lens elements.

In the case of employing the aspect group 1 regarding the first lens element, the first lens element includes a progressive power lens. That is, there is a need to prepare a plurality of kinds of progressive power lenses. It is needless to say that the first lens element can also be manufactured after the order of the spectacles (smart glasses) is received, but it is not realistic in terms of work efficiency to produce mutually different progressive surfaces each time an order is received. Therefore, realistically, semi-finished lenses having a progressive surface provided with a predetermined addition power formed on the object-side surface in advance are prepared in advance.

In the case of preparing semi-finished lenses in which prescription values other than the addition power are also reflected, as many kinds of semi-finished lenses as each prescription value can be combined need to be prepared.

On the other hand, in the case of employing the aspect group 1, the kinds of semi-finished lenses to be prepared are small. This is because the progressive power lens in the aspect group 1 realizes the addition power among the prescription values. If the semi-finished lens to be prepared is a progressive power lens that realizes the addition power, the kinds of semi-finished lenses to be prepared are significantly decreased compared with a case where prescription values other than the addition power are also reflected.

If the light guide member has a flat plate shape, the eyeball-side surface of the first lens element also becomes flat, and even time and effort for a new process can be saved as long as the surface of the semi-finished lens facing the progressive surface is made to be flat.

In the case of employing the aspect group 2 regarding the second lens element, the second lens element includes one minus lens having a negative lens prescription that is obtained by combining a negative lens prescription of the reciprocal of the predetermined one distance and the spherical equivalent, which is one of the prescription values. If the second lens element includes a minus lens, the process from a lens blank is easy compared with the prior art. If the light guide member has a flat plate shape, the object-side surface of the second lens element also becomes flat, and, furthermore, the process is easy.

The specific configuration for making the first lens element and the second lens element detachable from the spectacles is not limited. It is simply necessary to provide a mechanism enabling the first lens element and/or the second lens element to be alternately grasped or detached to any configuration of the spectacles. This mechanism may be provided to the light guide member, but the light guide member is a precision member and, while the light guide member is protected, it is not preferable to impart impact to the light guide member each time the lens element is grasped and detached. Therefore, it is preferable to provide the mechanism to the spectacle frame. In the spectacle frame, the mechanism is preferably provided to the rim at a position close to the spectacle lens.

As a specific example of the above-described mechanism, for example, a half rim that provides a rim only on the upside of the spectacles is employed, and, in the upside rim, grooves and stoppers that enable the first lens element and the second lens element that are positioned across the light guide member to be grasped and detached may be provided while the light guide member is fixed to the rim.

As another specific example of the above-described mechanism, for example, a full rim that provide a rim covering the entire circumferences of the spectacle lenses in the spectacles is employed, slots with a lid are provided in the upside rim, and the first lens element and the second lens element that are positioned across the light guide member may be inserted into and detached from the slots while the light guide member is fixed to the rim.

Modification Examples

Hitherto, an embodiment of the present invention has been described, but the above-described contents disclosed simply show an exemplary embodiment of the present invention. That is, the technical scope of the present invention is not limited to the above-described exemplary embodiment and can be modified in a variety of manner within the scope of the gist of the present invention. In addition, the above-described contents disclosed can also be arbitrarily selected and combined into the following modification examples.

In one aspect of the present invention, a case where the C lens prescription is 0.00D has been exemplified, but the present invention is applicable even when the C lens prescription is a different value. Specifically, the eyeball-side surface of the second lens element may be a toric surface made to correspond to the C lens prescription and the astigmatic axis Ax. In addition, even in a case where the prism diopter Δ is present as a prescription value, a shape corresponding to the prism diopter Δ may be reflected on the eyeball-side surface of the second lens element.

That is, the second lens element may realize at least any of a cylinder of other than 0D and a prism diopter of other than 0Δ among the prescription values. At that time, the first lens element may have a positive lens prescription of the reciprocal of the predetermined one distance in at least the lens center. In the aspect group 1, a progressive surface that realizes the addition power while maintaining the positive lens prescription in the lens center may be provided.

In one aspect of the present invention, the technical contents have been described to make a case where the surface shape of the second lens element is a spherical surface applicable to facilitate the description. Incidentally, the surface shape of the second lens element in one aspect of the present invention may be a spherical surface or may be a different shape (for example a toric surface or a shape corresponding to the prism diopter Δ).

In the aspect group 1, the object-side surface of the progressive power lens that is included in the first lens element needs to be a progressive surface which is a non-spherical surface. The surface that is adjacent to the light guide member in the first lens element (for example, the eyeball-side surface of the progressive power lens) and the surface that is adjacent to the light guide member in the second lens element need to have a shape following the main surfaces of the light guide member. In addition, the eyeball-side surface of the second lens element needs to have a shape that realizes prescription values other than the addition power and may be a spherical surface or a non-spherical surface.

In the aspect group 2, the object-side surface of the plus lens that is included in the first lens element may be a progressive surface which is a non-spherical surface as in the aspect group 1 or a spherical surface. The surface that is adjacent to the light guide member in the first lens element (for example, the eyeball-side surface of the plus lens) and the surface that is adjacent to the light guide member in the second lens element (for example, the object-side surface of the functional complex lens) need to have a shape following the main surfaces of the light guide member. In addition, the eyeball-side surface of the functional complex lens may be a spherical surface or a non-spherical surface as long as the surface has a lens prescription that is obtained by combining a negative lens prescription corresponding to the display distance and the spherical equivalent. Similar to the second lens element in the aspect group 1, the shape of the eyeball-side surface of the functional complex lens is not limited as long as the prescription values are made to be satisfied using the shape of the eyeball-side surface of the functional complex lens. In the aspect group 2, all of the prescription values including the addition power may be realized with the functional complex lens.

In the aspect group 1, a case where the first lens element includes a progressive power lens has been exemplified, but a different functional lens (for example, photochromic lens) may be provided together with the progressive power lens or instead of the progressive power lens.

In the aspect group 1, the fact that the first lens element includes a progressive power lens is one of the characteristics, and there is no need to include the characteristics of the aspect groups 2 and 3. For example, in the aspect group 1, the second lens element may include the lens element that exhibits a function of displaying a virtual image at a predetermined distance and the lens element that exhibits a function of correcting a wearer's refractive error as separate bodies. In addition, the first lens element and/or the second lens element may not be detachable from the spectacles.

Similarly, in the aspect group 2, there is no need to include the characteristics of the aspect groups 1 to 3. For example, in the aspect group 2, the first lens element may not include a progressive power lens, and all of the prescription values may be realized with the second lens element. In addition, the first lens element and/or the second lens element may not be detachable from the spectacles.

Similarly, in the aspect group 3, there is no need to include the characteristics of the aspect groups 1 and 2.

However, as described in the section of each aspect group, a large advantage is brought about by the configuration of each aspect group. Therefore, it is preferable to arbitrarily combine the configuration of each aspect group, and it is more preferable to combine part or all of the contents described in the section of each aspect group.

As described in the common matters to the aspect groups 1 to 3, one characteristic of one aspect of the present invention is to replace the varifocal lens in PTL 1 with a non-varifocal lens. Therefore, the technical concept of the present invention is also reflected in the lens element employed in each aspect group.

The configuration of the lens element in the aspect group 1 is as described below.

"A lens element including a first lens element that is one progressive power lens that realizes an addition power among prescription values and a plus lens having a predetermined positive lens prescription at a progressive starting point and a second lens element that is one minus lens that realizes values other than the addition power among the prescription values and has a negative lens prescription that is equivalent to the positive lens prescription in terms of the absolute value".

"Lens prescriptions equivalent in terms of the absolute value" in the present specification includes a case where lens prescriptions are completely the same as each other and also includes a case where the difference is within the range of the tolerance of the lens prescription (for example, 0.12D) in the spectacle lens.

The configuration of the lens element in the aspect group 2 is as described below.

"A lens element including a first lens element that is a plus lens having a predetermined positive lens prescription and a second lens element that is one minus lens having a negative lens prescription that is obtained by combining a negative lens prescription that is equivalent to the positive lens prescription in terms of the absolute value and a spherical equivalent, which is one of the prescription values".

Furthermore, the following configuration is preferably provided.

"The lens element, in which the first lens element is one progressive power lens that realizes an addition power among prescription values and a plus lens having a predetermined positive lens prescription at a progressive starting point".

In addition to the above-described configurations, a configuration in which the fact that the light guide member has a flat plate shape is reflected in the lens element is as described below.

"The lens element, in which the first lens element has two main surfaces, the second lens element has two main surfaces, and one main surface (the eyeball-side surface in one aspect of the present invention) of the first lens element and one main surface (the object-side surface in one aspect of the present invention) of the second lens element are both flat.

The aspect group 2 has one of the characteristics in the second lens element. The configuration of the lens element for which attention is paid to this fact is as described below.

"A lens element that is one minus lens having a negative lens prescription that is obtained by combining a spherical equivalent, which is one of the prescription values, and a negative lens prescription of −0.25D or less".

Therefore, the following configuration is preferably provided.

"The lens element in which the lens element has two main surfaces, and one main surface (the object-side surface in one aspect of the present invention) is flat".

Regarding the aspect group 3, a spectacle frame including the configuration in which the first lens element and/or the second lens element are detachable from the spectacles is also characteristic. A configuration for which attention is paid to this fact is as described below.

"A spectacle frame into which a spectacle lens is fitted, the spectacle lens having an object-side surface and an eyeball-side surface and including a light guide member, a first lens element that is adjacent to the light guide member on an object side, and a second lens element that is adjacent to the light guide member on an eyeball side, in which, when a light beam that passes through the first lens element and the second lens element forms an image to obtain an image of reality, a wearer's prescription values are realized with the first lens element and the second lens element, and a virtual image that is obtained by formation of an image with a light beam that travels in the light guide member and passes through the second lens element is displayed by the second lens element away from the wearer by a predetermined one distance, the spectacle frame including at least any of a first lens element holder having a mechanism of making the first lens element detachable and a second lens element holder having a mechanism of making the second lens element detachable (preferably, at least the second lens element holder)".

The technical concept of the present invention is reflected even in a virtual image display system including the spectacle lens and an image light emission part that emits image light and a program for making a function that is brought by the system exhibited in a computer.

REFERENCE SIGNS LIST

1 Spectacle lens
2 Light guide member
21 Side surface (edge)
3 First lens element
31 Object-side surface of first lens element
32 Eyeball-side surface of first lens element
4 Second lens element
41 Object-side surface of second lens element
42 Eyeball-side surface of second lens element
E Eye
V Light beam of virtual image (from image light emission part)
R Light beam of image of reality (from outside world)
O Pupil center and lens center

The invention claimed is:

1. A spectacle lens comprising:

an object-side surface; and an eyeball-side surface and comprising:

a light guide member;

a first lens element that is adjacent to the light guide member on an object side; and a second lens element that is adjacent to the light guide member on an eyeball side, wherein, a light beam that passes through the first lens element and the second lens element is focused on a retina to form an image of reality, and a light beam that travels in the light guide member and passes through the second lens element is focused on the retina to form a virtual image, the second lens element comprises one functional complex lens that integrates a lens element having a function of displaying the virtual image at a position away from a wearer by a predetermined one distance, and a lens element having a function of correcting a refractive error of the wearer, a spherical power of the functional complex lens is a value obtained by combining a spherical power of a prescription of the wearer, excluding a case where the spherical power is 0 D, and an additional power for displaying the virtual image at a position away from the wearer by the predetermined one distance, excluding a case where the additional power is 0 D, the first lens element includes a plus lens having a power with an opposite sign to the additional power, when the light beam passes through the first lens element and the second lens element focused on the retina to form an image of reality, the first lens element and the second lens element realize the prescription of the wearer, and when the light beam travels in the light guide member and passes through the second lens element focused on the retina of the wearer requiring vision correction according to the prescription to form the virtual image, the second lens elements allows the wearer to visually recognize the virtual image as being located at the position away from the wearer by the predetermined one distance.

2. The spectacle lens according to claim 1, wherein the light guide member has a flat plate shape having two flat surfaces, a surface on which the plus lens is adjacent to the flat surface of the light guide member is flat, and a surface on which the functional complex lens is adjacent to the flat surface of the light guide member is flat.

3. Spectacles comprising:

the spectacle lens according to claim 2; and a spectacle frame, wherein at least any of the first lens element and the second lens element is detachable.

4. The spectacles according to claim 3, wherein at least the second lens element is detachable.

5. The spectacles according to claim 3, wherein the spectacle frame includes at least any of a first lens element holder having a mechanism of making the first lens element detachable and a second lens element holder having a mechanism of making the second lens element detachable.

6. Spectacles comprising:

the spectacle lens according to claim 1; and a spectacle frame, wherein at least any of the first lens element and the second lens element is detachable.

7. The spectacles according to claim 6, wherein at least the second lens element is detachable.

8. The spectacles according to claim 6, wherein the spectacle frame includes at least any of a first lens element holder having a mechanism of making the first lens element detachable and a second lens element holder having a mechanism of making the second lens element detachable.

9. A method of designing spectacle lens, the spectacle lens comprising:

an object-side surface; and an eyeball-side surface and comprising:

a light guide member;

a first lens element that is adjacent to the light guide member on an object side; and a second lens element that is adjacent to the light guide member on an eyeball side, wherein, a light beam that passes through the first lens element and the second lens element is focused on a retina to form an image of reality, and a light beam that travels in the light guide member and passes through the second lens element is focused on the retina to form a virtual image, the second lens element comprises one functional complex lens that integrates a lens element having a function of displaying the virtual image at a position away from a wearer by a predetermined one distance, and a lens element having a function of correcting a refractive error of the wearer, a spherical power of the functional complex lens is a value obtained by combining a spherical power of a prescription of the wearer, excluding a case where the spherical power is 0 D, and an additional power for displaying the virtual image at a position away from the wearer by the predetermined one distance, excluding a case where the additional power is 0 D, the first lens element includes a plus lens having a power with an opposite sign to the additional power, positive lens prescription of a reciprocal of the predetermined one distance, when the light beam passes through the first lens element and the second lens element focused on the retina to form an image of reality, the first lens element and the second lens element realize the prescription of the wearer, and when the light beam travels in the light guide member and passes through the second lens element focused on the retina of the wearer requiring vision correction according to the prescription to form the virtual image, the second lens elements allows the wearer to visually recognize the virtual image as being located at the position away from the wearer by the predetermined one distance, the method comprising:

a step 1 of setting a shape of a surface, in the second lens element, that faces a surface adjacent to a flat surface of the light guide member and constitutes the eyeball-side surface of the spectacle lens, to a curved surface having a negative power capable of displaying the virtual image at a the position away from the wearer by the predetermined one distance;

a step 2 of setting a shape of a surface, that faces a surface adjacent to another flat surface of the light guide member and constitutes the object-side surface of the eyeglass lens, to a curved surface having a positive power equal in absolute value to the negative power; and a step 3 of resetting the shape of the surface, in the second lens element, that faces the surface adjacent to the flat surface of the light guide member so as to combine the negative power with a spherical power that is one of the prescription values.

10. The method of manufacturing spectacle lens, the method comprising manufacturing a spectacle lens designed by the method of designing spectacle lens according to claim 9.

* * * * *